United States Patent [19]

Tuason

[11] Patent Number: 5,403,191
[45] Date of Patent: Apr. 4, 1995

[54] LAPAROSCOPIC SURGERY SIMULATOR AND METHOD OF USE

[76] Inventor: Leo B. Tuason, 130 Boring Pl., Martinsville, Ind. 46151

[21] Appl. No.: 142,104

[22] Filed: Oct. 28, 1993

Related U.S. Application Data

[63] Continuation of Ser. No. 760,684, Oct. 21, 1991, abandoned.

[51] Int. Cl.$^6$ .............................................. G09B 23/28
[52] U.S. Cl. ...................... 434/262; 434/267
[58] Field of Search ............................... 434/262, 267

[56] References Cited

U.S. PATENT DOCUMENTS

| | | | |
|---|---|---|---|
| 3,775,865 | 12/1973 | Rowan | 434/262 |
| 4,321,047 | 3/1982 | Landis | 434/262 |
| 4,789,340 | 12/1988 | Zikria | 434/262 X |
| 4,907,973 | 3/1990 | Hon | 434/267 X |
| 5,055,051 | 10/1991 | Duncan | 434/267 X |
| 5,061,187 | 10/1991 | Jerath | 434/267 X |
| 5,149,270 | 9/1992 | McKeown | 434/267 X |

Primary Examiner—Cary E. O'Connor
Assistant Examiner—Jeffrey A. Smith

[57] ABSTRACT

An apparatus used in simulating the human body cavity whereby an individual user can practice endoscopic surgical procedures by duplicating the operative steps performed on actual true to life condition for the purpose of learning the art and constantly improving the skill of eye-hand coordination and manual dexterity. The simulator is provided with open sides to gain access into the cavity for placement of objects simulating human organs which are then mounted and anchored inside the cavity for practice simulation in instrument manipulation. Surgical instruments are inserted into the cavity through the pre-established apertures on the transparent plastic panel and the instruments are manipulated while performing the practice procedure without the benefit of direct binocular vision on the object-simulations; instead the trainee imitates and directs the activities inside the cavity under vision using the endoscopic-video-monitor system or by similar indirect viewing method provided by the reflecting mirrors of the two mirror concept, thus mimicking a real life operative condition.

4 Claims, 5 Drawing Sheets

LAPAROSCOPIC SURGERY SIMULATOR AND METHOD OF USE

CROSS REFERENCE TO RELATED APPLICATION

This is a continuation of application Ser. No. 07/760,684, filed Oct. 21, 1991, entitled Laparoscopic Surgery Simulator, which is now abandoned.

FIELD OF INVENTION

The present invention relates to a device for teaching, training and improving the eye-hand coordination of the surgeon or trainee in the new surgical high-tech VIDEO ASSISTED ENDOSCOPIC SURGERY by the use of an apparatus wherein the operative techniques like suturing tissues, cutting off organs and tying knots are simulated to resemble real-life conditions. The simulator also incorporates visual simulation as well as surgical maneuvers mimicking the instrumentation that one would pursue in endoscopic surgery in real life operating condition.

BACKGROUND OF THE INVENTION

Endoscopy is defined as a direct visualization of body cavities by the use of an instrument called an ENDOSCOPE (a small slender telescope with a built-in light source for illumination and a video camera at the back end of the endoscope connected to a TV monitor). When the body cavity of the abdomen is entered during the operation, it is called LAPAROSCOPY, on the chest it's THORACOSCOPY and the lower abdomen or pelvic region it's PELVISCOPY.

The early beginning of Endoscopic Surgery took placed in Europe and pioneered by Gynecologists where they performed tubal ligations, removal of ovarian tumors or cysts, lysis of adhesions and as a diagnostic procedure. Some of these surgeons were brave enough to remove the appendixes through ½ inch abdominal incisions.

It was the successful and safe removal of the appendix that led the aggressive and innovative general surgeons to explore the vast potential of the new surgical technology. Thus, the removal of the gall bladder or Laparoscopic Cholecystectomy was first performed in Europe in 1987 and only attracted minor curiosity. General surgeons were slow in accepting this new video assisted surgery but the procedure crossed the Atlantic in the early 1988 and thereafter several U.S. Surgical Centers began using this new operative technology with unerring success. The Laparoscopic Cholecystectomy has now become a standard Operative procedure in removing a diseased gall bladder.

The laparoscopic approach to the gall bladder and other organs has distinct advantages over the standard open technique in that, for many procedures visualization is very much improved as the endoscope can be placed directly over the surgical field several times magnified. Other advantages include reduced hospitalization, health care costs, a more rapid and less painful convalescence with faster return to employment and finally an improved cosmetic postoperative incisional wound scars results.

The introduction of state-of-the art instruments and equipment has made possible the diversified laparoscopic surgical procedures now being used in many hospitals throughout the United States and some countries around the world. The surgeon with his laparoscope inserted into the abdominal cavity through a ½ inch incision and a few more additional similar incisions for the delicate slender instruments like dissectors, tissue grasping forceps, suture-ligatures and laser probe, manipulates these tools outside the body cavity to remove the diseased gall bladder by watching a video screen monitor. Surgeon's hands are no longer in direct contact with body tissues when performing these maneuvers in the new laparoscopic surgery and all intricate movements executed intracorporeally and extracorporeally are assisted by the indirect viewing provided by the Endoscope Video-T.V. Monitor system.

The new initiate in this high-tech endoscopic surgical procedures is met with difficulties in the visual orientation and eye-hand coordination. To acquire operative skill required to gain competence in this video assisted surgical procedures and maintain the proficiency of the surgeon, he must continuously as often as possible perform these intricate maneuvers on live patients and must practice on inanimate objects using an apparatus like the present invention.

The earlier model made and widely used training device were built in Germany and one such device is called Semm Pelvi-Trainer. This simulator has a transparent panel on top with several openings where instruments and viewing scope are inserted and manipulated. It is provided with a method of holding organs which are suspended from the top panel using bead chains and clips. The exercise procedures are performed on living tissues like placenta or even muscle. Though these devices have prominent features, they also have significant drawbacks. This particular model was primarily constructed for training Gynecologists so that simulation of endoscopic operative techniques are geared and limited to the pelvic organs, thus it is appropriately named 'Pelvi-Trainer'.

Although this simulator functions satisfactorily in most cases, it tends to suffer from several problems which limits its usefulness. One such drawback is that, it encourages the use of Pelviscope (Endoscope I, please refer to Key Words). Endoscopes are expensive and are not readily available to many surgeons much less to the initiates.

Yet another drawback of the Pelvi-Trainer is that, when the surgeon uses the Pelviscope, he actually carries out the simulated instrumentation and practice procedures under direct monocular vision. This type of visualization as applied in endoscopic surgery has been replaced by Endoscope-Video-Monitor System which operates under indirect binocular vision, a system that is being used in actual live endoscopic operations and in some other training devices.

Still another drawback of this simulator is that, it has only one plastic panel with multiple openings that are positioned primarily for practice procedure on the pelvic cavity. It has no provision for practice simulation in the other body cavities like the chest, upper abdomen and the region of the kidneys.

Additional drawback of the Pelvi-Trainer is that, in the practice of simulation, the trainee can only use human tissue like placenta or animal parts. These materials are not readily available and their procurement might be difficult.

Another simulator that is recently brought out to the public is the Mckeown surgical training apparatus. This is an apparatus that has all its sides of black plexiglass making the inside cavity pitch-dark. This device apparently functions substantially identical in some aspects to the Semm Pelvi-Trainer One drawback that is very evident is that, the trainee has to use the apparatus with the aid of a scope (Endoscope I) which provides a magnified direct monocular vision similar to the Semm Pelvi-Trainer.

Yet another drawback of this apparatus is that, it has provision only for practice simulation on materials like animal parts or even human tissue which are suspended from the top plexiglass panel by chain beads and clips, a method exactly similar to the Semm Pelvi-Trainer.

The top lid plexiglass of the McKeown apparatus has multiple puncture positions that are appropriately used for simulation practice exercise on limited organ location, i.e., the placement and location of the apertures on the top lid is not suitable for practice simulation of endoscopic surgery on the chest or in the region of the kidneys and this is also a drawback of the device.

Still another drawback of this training apparatus is that, the trainee must always use an endoscope to perform practice simulation. The endoscope is an expensive item and are not readily available to most trainees, therefore the use of such apparatus is limited to hospital setting where the endoscope might be accessible to the trainee.

Another drawback of this device is that, the mounting of the organ object being practiced on is by clamps on bead chains suspended from the top plexiglass panel which makes the object a moving target and would need a steady hands to perform simulated delicate sewing technique and a near perfect result might be difficult to achieve.

It is clear and evident that the present invention has proven to have advantages over the other simulators and the versatility of its function is a welcome asset in achieving improved skill on eye-hand coordination. The fact that the present invention has shown distinct features that none of the other simulators possess makes it more desirable for the surgeon to practice simulation techniques on this recent cutting edge simulator. First, one advantage of the present invention over the others is the use of the Two Mirror Concept, a system of indirect binocular way of viewing objects and simulation of activities inside the cavity of the simulator. This is the same viewing method used in real life operative conditions with the aid of the Endoscopic-Video-Monitor System.

Second, the individual user can perform practice procedure in simulating visual and instrument manipulation on the present invention under indirect binocular vision applying either system. If for some reason the Endoscopic-Video-Monitor System is not available, the trainee can still practice simulation that mimics true to life operating situations using the Two Mirror Concept System, a feat unmatched by the other simulators.

Third, with the interchangeable clear and transparent plastic panels that have strategically positioned apertures, the surgeon can simulate practice surgical procedures mimicking real life operating conditions on the different body cavities like the chest, upper abdomen, pelvic and the region of the kidneys by using the specific panel for each individual operative technique on the chosen cavity. These practice maneuvers when translated into the actual live operation, the individual user will recall where to place the punctures on the body wall.

Fourth, additional advantage of the present invention over the other simulators is the use of life size object-simulations which are made of foam rubber mounted and anchored on pads and platforms of the same material in a unique modular arrangement. This is an important feature not provided by the other simulators and one that appeals to the individual user because it's easier to change wornout object-simulations during practice procedure.

Fifth, the present invention is constructed with all lateral sides completely open allowing easy access to the inside cavity for placement and removal of object-simulations used in the exercise procedure and the open sides permits easy cleaning after the simulation experience. Some of the simulators are partially enclosed and provided by side panel with access window which may require more time to clean the inside cavity after using objects like, human placenta or animal tissue.

OBJECTS AND SUMMARY OF THE INVENTION

Key Words and Definition.

Endoscopy and Laparoscopy . . . interchangeable words which means visualization of organ objects and surgical maneuvers inside the body cavity with the use of an endoscope (a slender telescope).

Old Generation Endoscope (Endoscope I) . . . an endoscope that is plain having integral parts of viewing lenses and fiberoptic illumination thus, providing the individual user a magnified direct monocular viewing capability, akin to looking through a standard telescope.

New Generation Endoscope (Endoscope II) . . . an endoscope of the present and the future, has an integral system of viewing lenses, fiberoptic illumination and a video camera attached to the rear end of the endoscope, connected to a light source and finally to a high resolution T.V. monitor, thus providing the individual user a magnified indirect binocular viewing capability (the surgeon using both eyes to view the activities inside the body cavity through the T.V. monitor).

Minimally Invasive Video Assisted Endoscopic Surgery . . . the surgeon uses the New Endoscope II in the practice of the high-tech endoscopic procedures making ½ inch skin incisions (instead of 6 to 8 inches in the standard procedure) and performs minimal transgression on body tissues.

Intracorporeal . . . inside body cavity.

Extracorporeal . . . outside body cavity.

Simulator and Apparatus . . . are interchangeable terms which have the same meaning.

Trocar . . . instrument used to puncture the body wall, thus providing an aperture for the instrument or endoscope to gain access into the body cavity.

Hook-Loop Fastener Set . . . this is generic and VELCRO is an example. The set consists of paired fastener tapes mounted on a solid material placed inside the cavity of the simulator, whereby during the practice procedure, the trainee inserts a tissue holding instrument through the trocar port aperture and use the instrument to peel and shift one of the 'hook' tape and attach the same to the adjacent corresponding mate 'loop' tape and the process is done repeatedly. The trainee manipulates the instrument from outside the cavity while viewing the inside activities through the clear-transparent plastic panel under indirect binocular vision aided by the Two Mirror Concept. This practice exercise enhances eye-hand coordination.

Plastic . . . this is generic and PLEXIGLAS, a polymer, is an example. The plastic panel is a clear and transparent material simulating the body wall of the living, provided with multiple pre-established apertures or trocar ports which are covered by resilient pressure sensitive circular rubber plates (rubber foam material) with small opening at the center through which the instruments are inserted, thus providing a simulated resiliency of a living body wall as the trocar penetrate it to gain entry into the cavity.

Endoscope-Video-Monitor System . . . an indirect binocular viewing system incorporating the Endoscope II with its finer attributes as applied in a real life situation whereby the surgeon uses both eyes to view the activities inside the body cavity through a T.V. monitor.

Two Mirror Concept . . . the use of a pair of reflecting mirrors strategically positioned atop the simulator when adjusted accordingly will provide a simulated indirect binocular way of viewing object-simulations and maneuvers inside the cavity of the simulator.

The preferred embodiment of the present invention would provides a simulator that is rectangular shaped hollow box simulating the human cavity where objects and activities are viewed through a clear and transparent plastic panel under indirect binocular vision aided by the Two Mirror Concept, thus it affords an individual user a means to improve his skill in eye-hand coordination and manual dexterity.

Another object of the present invention is to provide an apparatus that is multipurpose in its function, i.e., an individual user is able to do practice procedures simulating real life condition using either the Endoscope-Video-Monitor System or the Two Mirror Concept, both of which are indirect binocular viewing systems. When the surgeon decides to use the Two Mirror Concept in a practice simulation, he mimics the real life condition and carries out instrument manipulation under indirect binocular vision whereby one mirror focuses on the object-simulations inside the cavity of the simulator and reflects on the other mirror through the clear-transparent plastic panel, producing a reversed mirror image. The surgeon watches the second mirror thereby seeing the organ-simulation in its normal anatomical position.

Yet another object of the present invention is to provide an interchangeable clear and transparent plastic panels with multiple pre-established strategically positioned apertures or trocar ports on each panel specific for an individual surgical procedure on whatever simulated body cavity is chosen—like the chest, abdomen or pelvic region.

Still another object of the present invention is to provide a method of positioning object-simulations by modular arrangement. These object-simulations can be in the shape of human organs made of foam rubber which are mounted on pads of similar material and anchored to a foam rubber platform the size of which is large enough to occupy the entire base of the simulator, hence an individual user has a means of quick and easy change of worn-out object-simulation with new ones during the practice simulation of real life operating condition.

Another embodiment of the present invention provides a simulator that incorporates the Hook-Loop Fastener Practice Set, a method by which the surgeon can reinforce his skill on simulated visual and instrument manipulation.

Finally, the simulator of the present invention possesses indispensable conceptual characteristics that resemble real life operating conditions. When the simulator is properly used, it can provide a means to learn surgical techniques and allows a surgeon familiar with the human anatomy and skilled in conventional surgery to attain a certain amount of dexterity necessary to safely perform endoscopic surgery in a true to life condition.

BRIEF DESCRIPTION OF DRAWINGS

The various aspects of the present invention will-be fully understood when the following portions of the specifications are read in conjunction with the accompanying drawings. Furthermore, it is understood that the description of the construction of the apparatus is based on the initial prototype whose frame is of wood material and that these simulators could be made out of plastic material or one of its polymers like PLEXIGLAS for market.

DESCRIPTION OF THE PREFERRED EMBODIMENT

The apparatus of the present invention is a hollow box having a cavity that simulates that of the human body wherein the practice exercise on simulated surgical procedures are performed. The rectangular box with inside cavity is well demonstrated in FIGS. 6, 7, and 8 and here the practice procedures are accomplished simulating those surgical techniques that trainee would pursue in real life operative condition.

The simulator of the present invention has open sides providing easy access into the cavity for setting up object simulations of foam rubber material in the shape of human organs, mounted and anchored on pads and platforms of the same material, in which the trainee practices simulation of surgical techniques like suturing, knot tying, and instrument manipulation, thus enhancing his skill in eye-hand coordination.

A clear and transparent PLEXIGLAS panel occupies the top side of the simulator which correspond to the body wall in real life condition. Multiple pre-established apertures or trocar ports are in this plastic panel which is covered by resilient pressure sensitive circular foam rubber plates and at the center of the plates are small openings through which instruments are inserted during practice simulation. The interchangeable feature of the plastic panel makes it versatile in its function whereby a surgeon can simulate practice procedures mimicking real life operating conditions on the different body cavities like the chest, upper abdomen, pelvis and the region of the kidneys by using the specific panel for each individual operative technique on the chosen cavity.

Having set the initial phase of simulation, the remainder of the steps to make the apparatus functional is the placement of the adjustable paired mirrors located on top of the simulator, each attached to the far end of the top side with their reflecting surfaces facing each other whereby said mirrors acting in unison affords the surgeon an indirect binocular way of viewing the activities in the cavity through the transparent PLEXIGLAS panel. In a hospital setting where the Endoscope-Video-Monitor System is available for practice exercise, the surgeon can use this indirect binocular visual system on the simulator of the present invention in lieu of the Two Mirror Concept.

The simulator of the present invention can improve the surgeon's skill on eye-hand coordination and develops his manual dexterity by performing practice simulation on the Hook-Loop Fastener Tape Set, whereby the individual user manipulates the instruments from outside the cavity while viewing the inside activities through the transparent and clear PLEXIGLAS panel under indirect binocular vision of the Two Mirror Concept, hence this practice simulation is performed in an environment resembling true to life operative conditions.

Since certain changes may be made in the above apparatus without departing from the scope of the invention herein involved, it is intended that all matter contained in the above description or shown in the accompanying drawings shall be interpreted in an illustrative and not in a limiting sense.

It is apparent that many more surgical procedures could be learned by using the apparatus and practice Sets on simulation and the previous description is in no way a limit to the utilization of the simulator of the present invention.

DETAILED DESCRIPTION OF THE INVENTION

The description of the present invention simulator 1 is based on the initial prototype which is constructed of wood material for all its frame and that these simulators could be manufactured out of plastic material or one of its polymer PLEXIGLAS to market.

Figure 1:
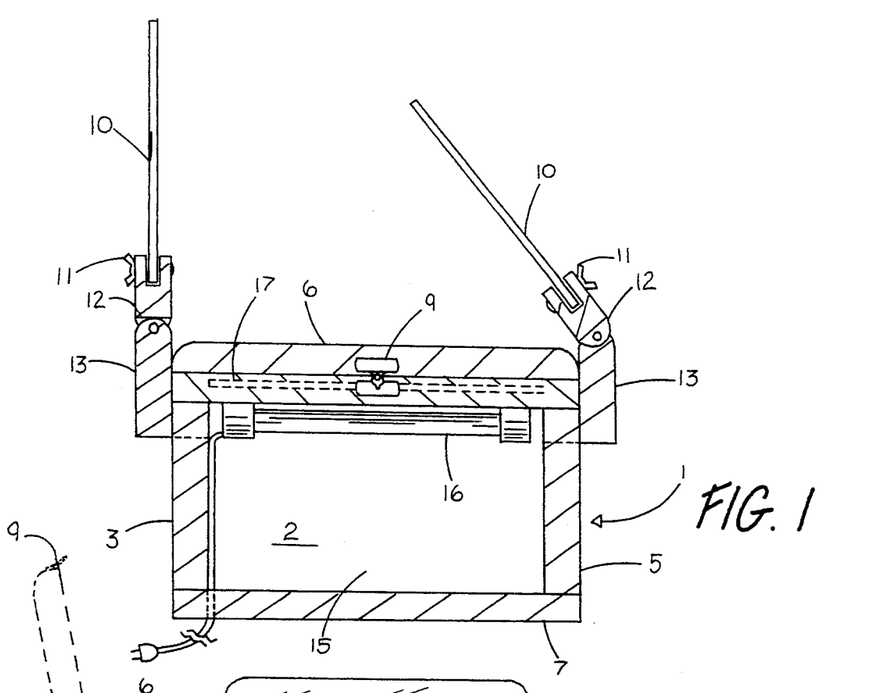
FIG. 1 is a side elevation view of the simulator showing one end of a rectangular shaped hollow box with two mirrors on top, a florecent lamp and plastic panel in dash lines.
Figure 2:
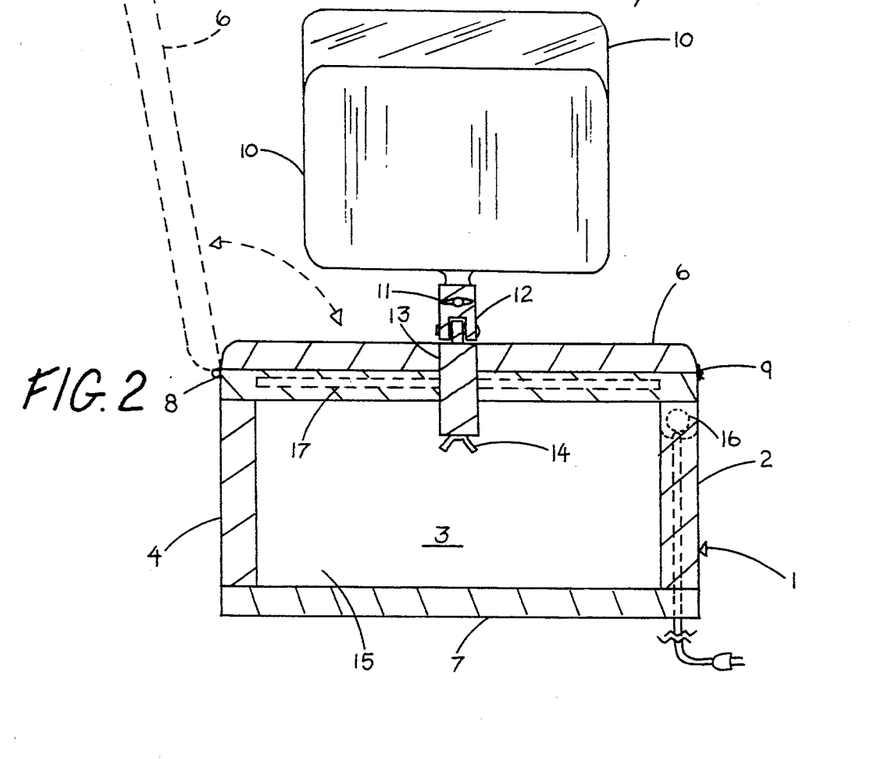
FIG. 2 is a side elevation view of FIG. 1 showing another side of the box, the two mirrors with their reflecting surfaces facing each other and an open lid or hatch illustrated as dash lines.

Referring first to FIGS. 1 and 2 of the drawings, they show two views of the simulator 1, a rectangular shaped box having 6 sides; 2 and 3 are the end sides, 4 and 5 are the lateral sides, 7 is the bottom side and hatch 6 is the top side. This is an enclosed hollow box with a cavity 15 inside simulating that of human body cavity.

Hatch 6 is provided on the top of simulator I and is attached to side 4 frame by two hinges 8 and the free end of hatch 6 has latch 9. Hatch 6 in FIGS. 1 and 2 is in closed position. When hatch 6 is opened as in FIG. 8, it allows the individual user to change the clear and transparent plastic panel 17 shown also in FIG. 8. In the functional position of plastic panel 17, it is slipped into the grooves 23 provided at the top end frames of sides 2, 3, 4, and 5 illustrated best in FIG. 9. In this particular embodiment, when the hatch 6 is closed and the plastic panel 17 is in its functional position, shown in FIGS. 6, 7 and 10 with latch 9 in place, the cavity 15 is created, whereby most of the practice simulation takes place.

At the top end frame of side 2 in FIGS. 1, 6, 7 and 8 is attached fluorescent lamp 16 which can provide added illumination inside the cavity 15.

Figure 3:
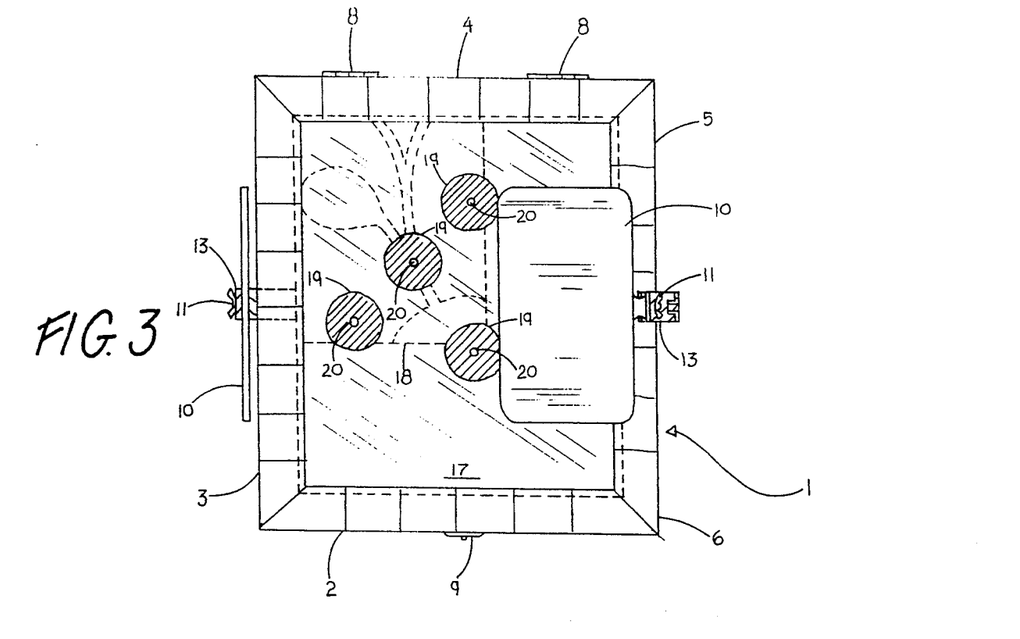
FIG. 3 is a plan top view of the simulator showing the two mirrors and object-simulation mounted on a foam rubber pad illustrated as dash lines observed through the clear and transparent PLEXIGLAS panel also in dash lines.
Figure 6:
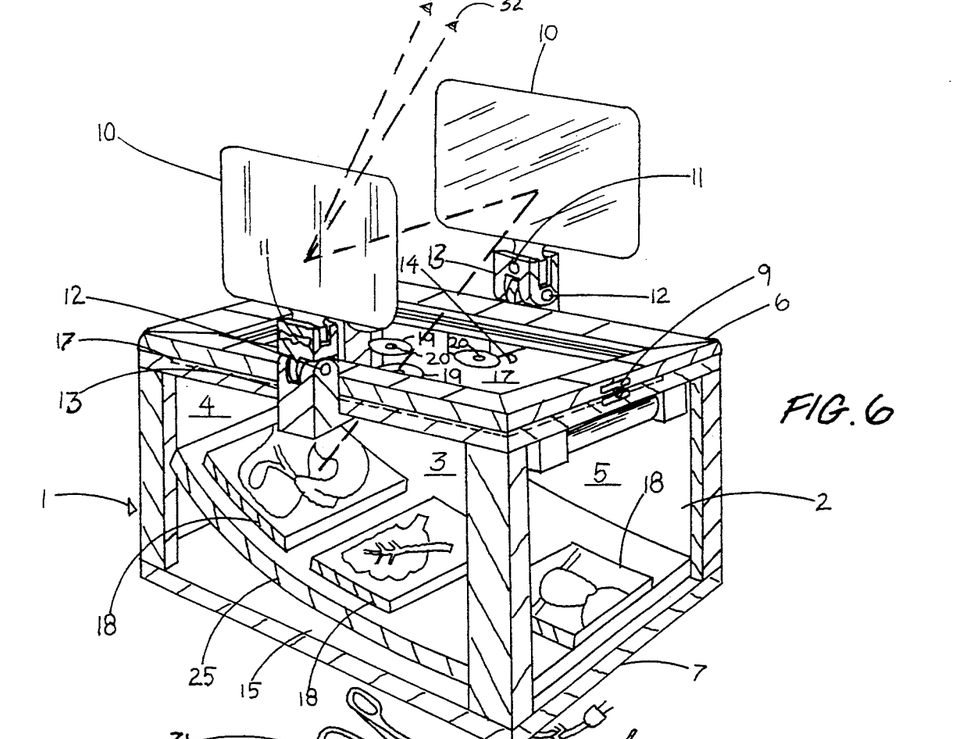
FIG. 6 is a perspective view of an alternative embodiment of the simulator comprising components already mentioned in FIGS. 1 and 2 except the lid or hatch is closed and illustrating the modular orientation of the object-simulations and the two mirrors showing the reflecting image projection in dash lines.

The clear-transparent plastic panel 17 as shown in FIG. 3 is in its functional position in a top view elevation and in this layout, the simulated object mounted on foam rubber pad 18 inside the cavity 15 can be seen by the trainee through the plastic panel 17 under indirect binocular vision applying the Two Mirror Concept as shown in FIG. 6 while both eyes 32 of the trainee are perceived as integral part of the indirect binocular viewing process.

Figure 4:
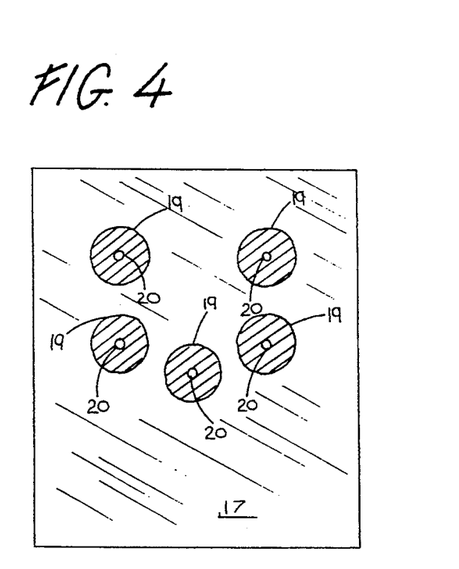
FIG. 4 is a top and FIG. 4a is a side elevation view of the PLEXIGLAS panel showing multiple openings on the circular pressure sensitive rubber plates.
Figure 4A:
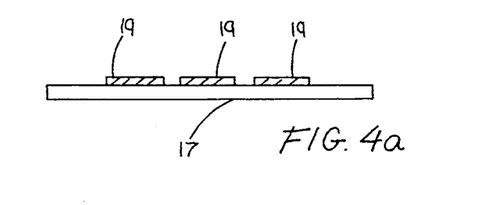
Figure 5:
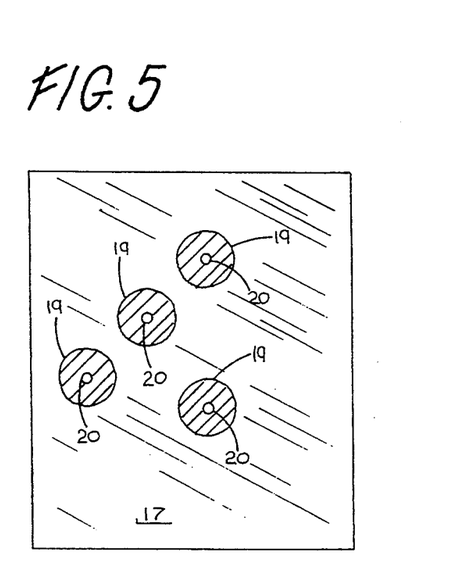
FIG. 5 is a top and FIG. 5a is a side elevation view of the PLEXIGLAS panel similar to FIGS. 4 and 4a except that it shows multiple openings at different location and number specific for individual operative practice procedure.
Figure 5A:
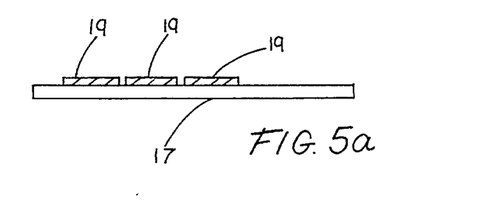

In FIGS. 4 is a top and 4a is a side elevation view of plastic panel 17. FIGS. 5 and 5a are similarly illustrated with the exception that each plastic panel has multiple pre-established apertures 22 shown best in FIG. 9, has the apertures 22 at different locations and numbers specific for individual practice procedures.

Figure 9:
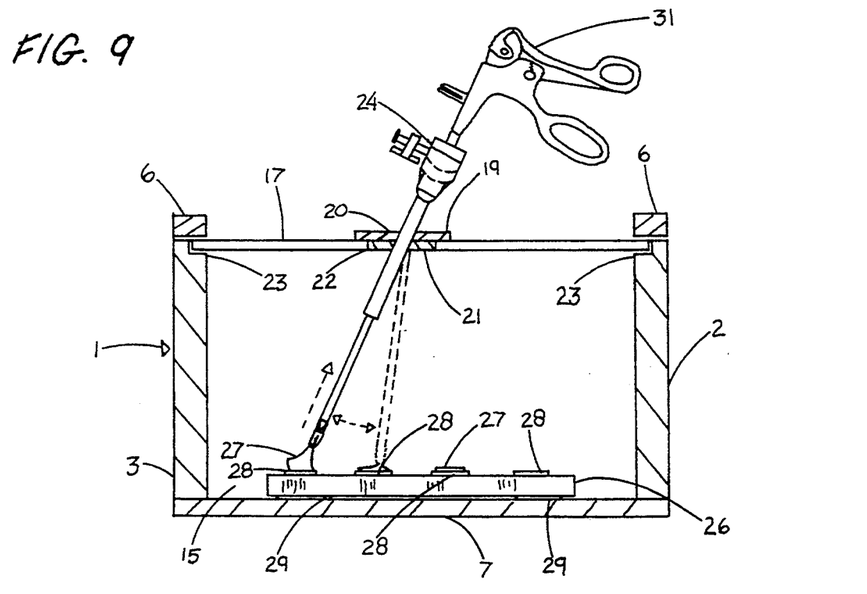
FIG. 9 is a cross section of the simulator as taken substantially along lines 30 to 30 of FIG. 10 showing an instrument inside a trocar in its functional position being inserted through the circular rubber plate of the PLEXIGLAS panel and also shows simulated movements of the instrument in dash lines and arrows.

The plastic panel 17 is provided with multiple apertures 22 shown in FIG. 9. The apertures 22 are covered with a resilient pressure sensitive circular foam rubber plates 19 and at the center of these plates 19 are small openings 20 through which the trocar 24 and instruments 31 are inserted during practice procedure. Another smaller circular pressure sensitive plate 21 covers the aperture 22 and attached to the under surface of plate 19, thus reinforcing the holding strength of plate 19 against the in and out movement of the trocars 24.

The plastic panel 17 of simulator 1 simulates the human body wall. The resiliency provided by the plates 19 and 21 in FIG. 9 observed when the trocar 24 penetrates the plates 19 and 21 to gain entry into the cavity 15 of simulator 1 creates certain amount of resitance similar to that encountered in the living body wall when punctured by trocar 24.

The simulator 1 has four open sides 2, 3, 4, and 5 shown in FIGS. 1 and 2. All of these sides provides easy access to the cavity 15 for setting up the simulated objects mounted on foam rubber pads 18 and placement of the platform 25 used in the exercise procedures and also can provide access for easy cleaning of the cavity 15 after practice exercise on human or animal tissues.

On top of simulator 1 is a pair of reflecting mirrors 10 that are located on the top frame of sides 3 and 5 shown in FIG. 6 and clearly illustrated in FIGS. 1 and 2.

The mirror holders 13 as shown in FIGS. 1 and 2 are L-shaped structures; the vertical portion holds the mirror 10 in a slot provided and firmly fitted and held secured by a threaded wing nut fastener 11. A short distance from the tip of the same mirror holder 13 is a hinge joint and the articulated parts are held by a threaded fastener 12 thus provides a means of adjusting the mirror 10 to an angle for proper alignment of the reflecting surfaces working in unison in order the achieve the indirect binocular visual capability.

The horizontal portion of the mirror holder 13 is attached to the top frame of sides 3 and 5 shown in FIGS. 1 and 2 secured by threaded fastener 14, detachable and allows changing of position in order to align the mirrors 10 for the purpose of obtaining a perspective view of simulated objects by using the principle provided by the Two Mirror Concept.

Figure 7:
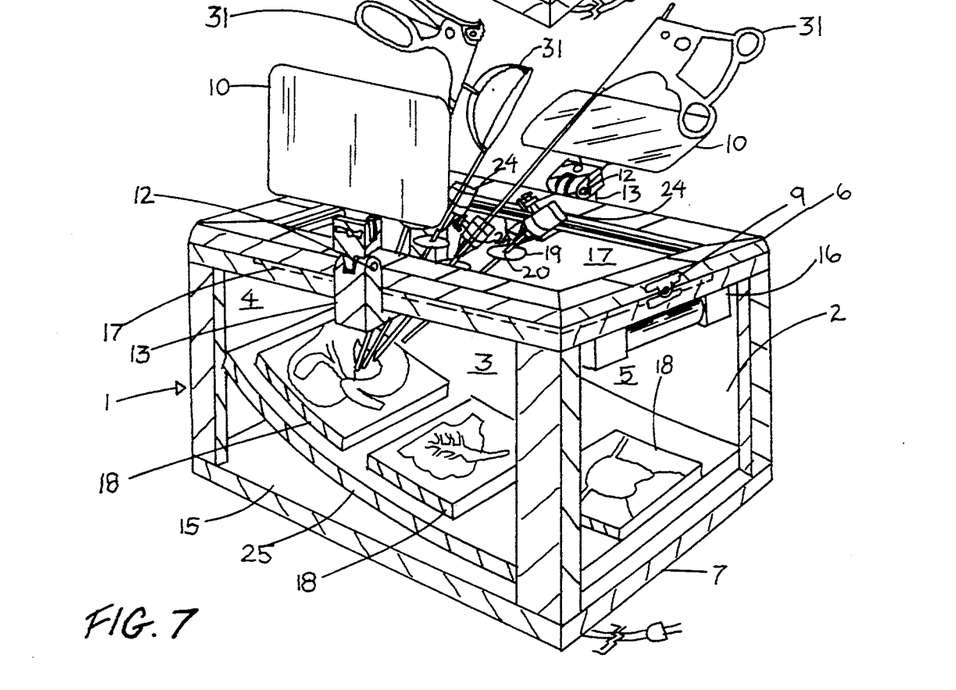
FIG. 7 is similar to FIG. 6 except that the trocars and instruments are illustrated in their functional positions entering the cavity through the pre-established apertures on the plastic panel.
Figure 8:
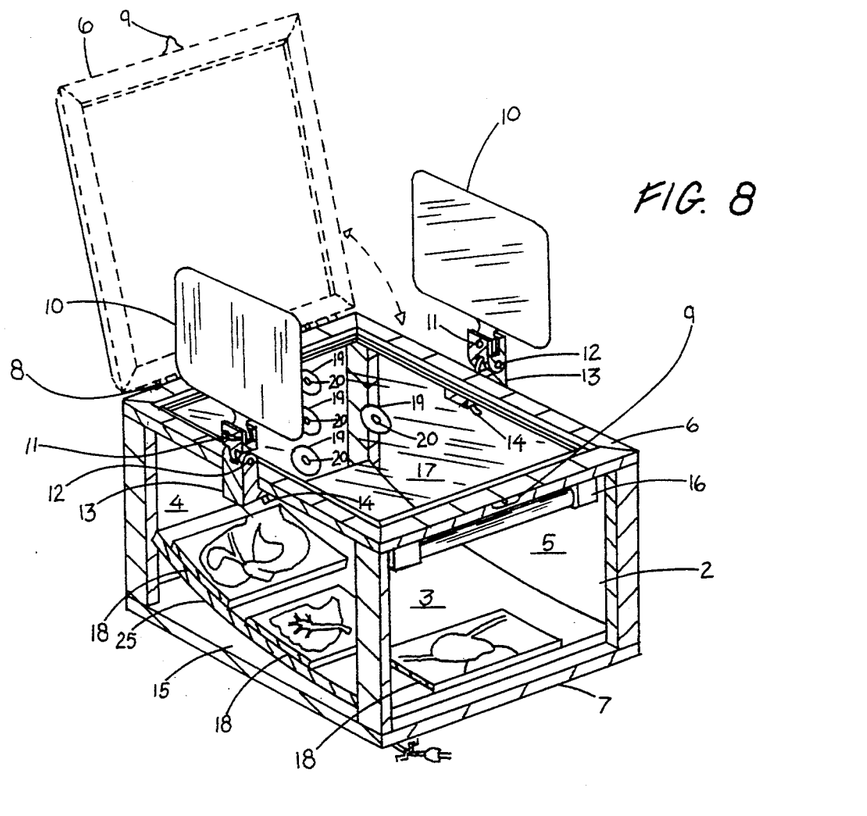
FIG. 8 is a perspective view similar to FIG. 6 of the simulator except that the top hatch frame is open illustrated as dash lines and this allows the placement and changing of the PLEXIGLAS panel.

FIGS. 6, 7 and 8 illustrates another embodiment of a simulator wherein the object-simulations are presented in a modular arrangement. These are foam rubber in the shape of human organs and each simulated object is mounted on pad 18 of similar material and said pad 18 is anchored to a platform 25 also of foam rubber. The pad 18 is "pinned down" (straight pins not seen in the illustration) to the platfoarm 25 which is large enough to occupy the bottom side 7 of simulator 1. The platform 25 is positioned in a slightly bent attitude to create the illusion of depth.

This method of modular arrangement of the simulated objects affords the individual user a means of quick and easy change of wornout simulated foam rubber objects with new ones during the practice procedures.

Figure 10:
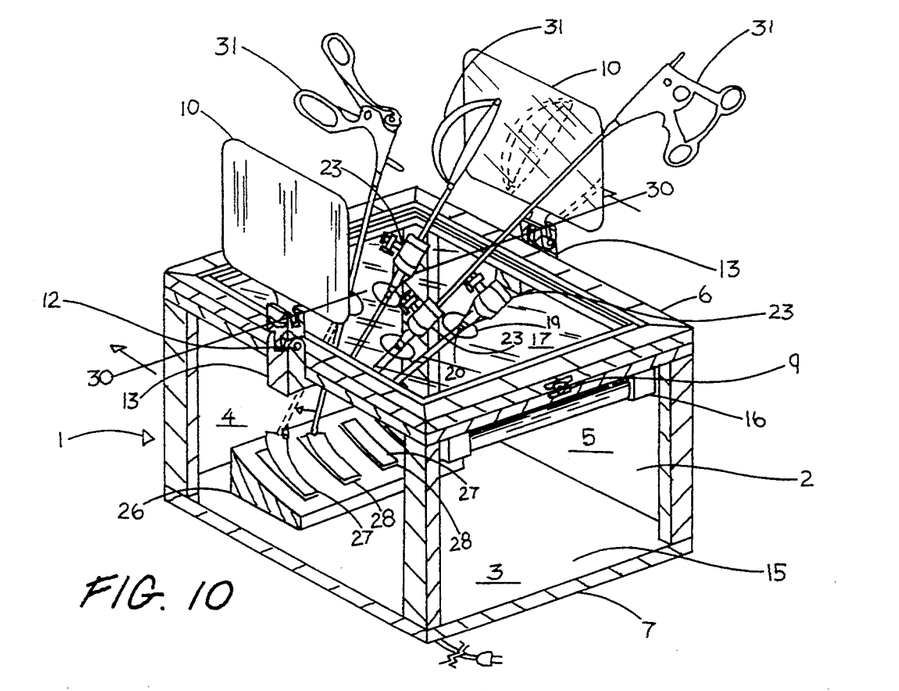
FIG. 10 is a perspective view of an alternative embodiment of the simulator similar to FIG. 7 except that the Hook-Loop Fastener Practice Set has replaced the large foam rubber platform and showing instrument movements in dash lines and arrow.
Figure 11:
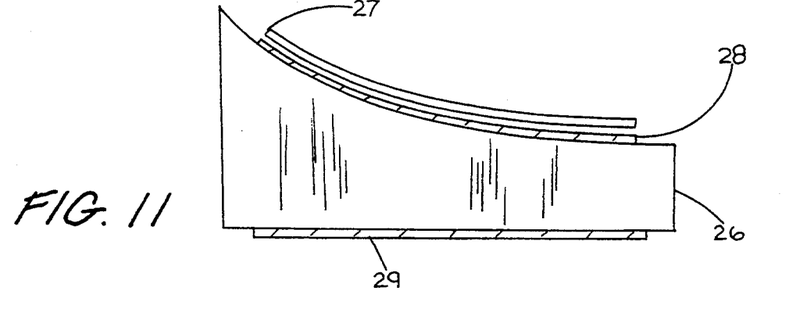
FIG. 11 is a side elevation plan of FIG. 12.
Figure 12:
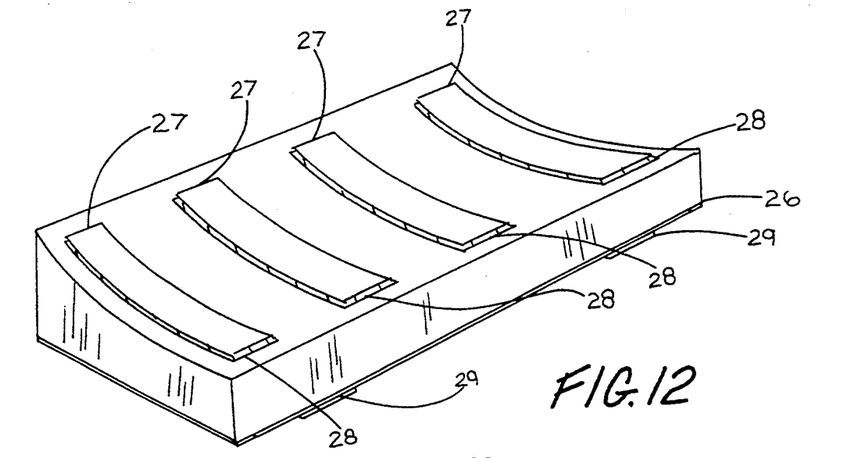
FIG. 12 is a perspective view of an alternative embodiment of the simulator showing the Hook-Loop Fastener Practice Set illustrating the relationship between the hook and the loop tapes mounted on a solid material and also shows a fastener tape at the bottom of the Set which mates with a tape glued to the base of the simulator.

Another embodiment of a simulator is collectively called Hook-Loop Fastener Set. This set consists of paired fastener tapes; hook tape 27 and loop tape 28, similar to a VELCRO fastener Four pairs of hook-loop fasteners are illustrated in FIGS. 10 and 12 mounted on the solid material platform 26. The loop fastener tape 28 is pressure sensitive and glued to the slightly curved surface of platform 26, while its mate hook fastener tape 27 is free to be 'peeled and shifted' around and finally attached to another loop fastener tape 28 and movement is repeated during the practice simulation.

In the practice simulation on the Hook-Loop Fastener Tape Set, platform 26 is placed inside the cavity 15 with fastener tape 29 attached to its 'mate' (not seen) which is pressure sensitive and glued to the bottom side 7 of simulator 1 as shown in FIG. 10.

The trocars 24 and instruments 31 are in their functional positions shown in FIGS. 9 and 10 wherein one hook fastener tape 27 is shown as being 'peeled' off by a tissue holding instrument and 'shifting and attaching' the same to another loop fastener tape 28. The movements are illustrated as dash lines and when repeated and properly performed practice procedure without cheating, the individual user can improve eye-hand coordination and manual dexterity.

METHOD OF USE

The apparatus of the present invention is a rectangular box which has a cavity wherein practice simulation are performed in the same manner as it would be in a real life operative condtion. Simulated organ objects out of foam rubber mounted on pads 18 and anchored on platform 25 of the same material are placed inside the cavity 15 for the surgeon practice simulation of operative techniques.

The clear and transparent plastic panel 17 occupies the top side of the simulator 1 which correspond to the body wall in real life condition. The multiple pre-established apertures 22 covered by resilient foam rubber plates 19 and 21, with small openings 20 at the center where trocars 24 and instruments 31 and Endoscope II (not seen in the illustration) are inserted through the trocar ports 22 to practice simulation in the cavity 15. The instrument manipulation is done exterior to the cavity 15.

When the surgeon wishes to apply the principle of Two Mirror Concept in practice simulation, he mimics the real life condition and carries out instrument manipulation and observes activities in the cavity 1 under indirect binocular vision where by one mirror 10 focuses on the object-simulation (foam rubber in the shape of human organs) inside the cavity 15 of simulator 1 and reflects the image on the other mirror 10 through the clear-transparent plastic panel 17, thereby producing a reverse mirror image. The surgeon (eyes 32) watches the second mirror and observes the simulated object in its normal anatomical position, the process is illustrated in FIG. 6.

When the individual user wishes to practice simulation he can use the Hook-Loop Fastener Tape Set whereby in essence it consists of instrument manipulation outside the cavity while activities inside the cavity where VELCRO tapes shifted around as previously described, if performed repeatedly can improve eye-hand coordination through simulation process.

What is claimed is:

1. A surgical training apparatus which allows surgeons and trainees to learn and teach endoscopic surgery procedures by practice simulation of real-life conditions in order to improve skills in eye-hand coordination and manual dexterity comprising:

a) a box having a plurality of lateral sides, a top side, and a bottom side, and having a cavity therein, said cavity removably containing at least one of a plurality of unique objects simulative of human organs, said at least one of said plurality of objects allowing a particular endoscopic operative procedure to be performed;

b) access means in at least one of said plurality of lateral sides for allowing said at least one of a plurality of objects to be inserted into and removed from said cavity through said one of said plurality of sides;

c) means affixed to said box and within said cavity for mounting and fixedly anchoring said at least one of a plurality of objects adjacent said bottom side when said at least one of a plurality of objects is inserted within said cavity, said mounting and anchoring means comprising foam rubber;

d) one of a plurality of clear and transparent plastic panels slidably and removably affixed to said top side, each of said plurality of clear and transparent panels having a unique pattern of apertures located therethrough, each of said apertures being in receiving engagement with a rubber plate having an opening therethrough, said unique pattern of apertures permitting the practice of said particular operative procedure corresponding to the particular at least one of a plurality of unique objects which is concurrently held within said cavity, the concurrent use of said unique pattern and said at least one of a plurality of unique objects thereby permitting real-life simulation of said operative procedure; and e) an adjustable pair of mirrors each having a reflective face, one mirror each attached to said box adjacent the top side, each said mirror being adjustably mounted such that each said mirror may be positioned in face-to-face relation to the other said mirror to provide an indirect way of viewing said at least one of a plurality of objects in the cavity during the practice procedure.

2. The surgical training apparatus of claim 1, wherein the at least one of a plurality of unique objects is a hook and loop fastener tape set, said set allowing the enhancing of eye-hand coordination and improved manual dexterity by the user performing a practice procedure and instrument manipulation from outside the cavity on the tape set.

3. The surgical training apparatus of claim 1, wherein said mounting and fixedly anchoring means comprises a first, larger foam rubber platform and a smaller, second foam rubber pad, and whereby said one of a plurality of unique objects is attached to said smaller, second foam rubber pad, and said mounting and fixedly anchoring means provides practice exercise on endoscopic technique that mimics real life operating conditions.

4. A simulation method of training and enhancing the skills required of a surgeon in an actual endoscopic procedure comprising the steps of:

a) providing a surgical training apparatus comprising:

i) a box having a plurality of lateral sides, a top side, and a bottom side, and having a cavity therein, said cavity removably containing at least one of a plurality of unique objects simulative of human organs, said at least one of said plurality of objects allowing a particular endoscopic operative procedure to be performed;

ii) access means in at least one of said plurality of lateral sides for allowing said at least one of a plurality of objects to be inserted into and removed from said cavity through said one of said plurality of sides;

iii) means affixed to said box and within said cavity for mounting and fixedly anchoring said at least one of a plurality of objects adjacent said bottom side when said at least one of a plurality of objects is inserted within said cavity, said mounting and anchoring means comprising foam rubber;

iv) one of a plurality of clear and transparent plastic panels slidably and removably affixed to said top side, each of said plurality of clear and transparent panels having a unique pattern of apertures located therethrough, each of said apertures being in receiving engagement with a rubber plate having an opening therethrough, said unique pattern of apertures permitting the practice of said particular operative procedure corresponding to the particular at least one of a plurality of unique objects which is concurrently held within said cavity, the concurrent use of said unique pattern and said at least one of a plurality of unique objects thereby permitting real-life simulation of said operative procedure; and v) an adjustable pair of mirrors each having a reflective face, one mirror each attached to said box adjacent the top side, each said mirror being adjustably mounted such that each said mirror may be positioned in face-to-face relation to the other said mirror to provide an indirect way of viewing said at least one of a plurality of objects in the cavity during the practice procedure;

b) selecting said at least one of a plurality of unique objects simulative of human organs;

c) inserting said at least one of a plurality of objects so selected through said access means and within said cavity;

d) releasably mounting said at least one of a plurality of objects to said box and within said cavity;

e) selecting said one of a plurality of clear and transparent plastic panels, said panel so selected as to correspond to said at least one of a plurality of unique objects so selected;

f) releasably affixing said one of said plurality of panels so selected to said top side of said box;

g) removably inserting an endoscopic instrument through one of said apertures such that a first end of said instrument is within said cavity while a second end of said instrument is outside said cavity; and h) manipulating said second end of said instrument to affect actuation of said first end of said instrument such that said actual operative procedure is mimicked.

* * * * *